United States Patent [19]

Matsumoto

[11] Patent Number: 5,678,111
[45] Date of Patent: Oct. 14, 1997

[54] METHOD AND APPARATUS OF PROCESSING RECORDING MEDIA

[75] Inventor: Nobuo Matsumoto, Kanagawa, Japan

[73] Assignee: Fuji Photo Film Co., Ltd., Kanagawa, Japan

[21] Appl. No.: 611,477

[22] Filed: Mar. 5, 1996

[30] Foreign Application Priority Data

| Mar. 13, 1995 | [JP] | Japan | 7-052532 |
| May 1, 1995 | [JP] | Japan | 7-107404 |

[51] Int. Cl.⁶ .......................... G03D 13/00; B65H 39/10
[52] U.S. Cl. .......................... 396/564; 271/298; 271/300; 396/612
[58] Field of Search ........................ 396/612, 613, 396/617, 622, 564; 355/27–29, 75, 76; 271/225, 300, 298, 184, 267

[56] References Cited

U.S. PATENT DOCUMENTS

| 4,126,391 | 11/1978 | Nishimoto | 355/27 |
| 4,191,369 | 3/1980 | Matsuda et al. | 271/299 |
| 4,705,376 | 11/1987 | Schaub et al. | 396/570 |
| 5,374,972 | 12/1994 | Nakane et al. | 396/613 |
| 5,407,190 | 4/1995 | Hehn | 396/612 |
| 5,430,520 | 7/1995 | Toki et al. | 396/612 |
| 5,452,050 | 9/1995 | Ishikawa et al. | 355/27 |

FOREIGN PATENT DOCUMENTS

| 58-29464 | 6/1983 | Japan | G03D 3/00 |
| 4-106537 | 4/1992 | Japan | G03B 27/00 |
| 5-341398 | 12/1993 | Japan | G03B 27/46 |

Primary Examiner—D. Rutledge
Attorney, Agent, or Firm—Sughrue, Mion, Zinn, Macpeak & Seas, PLLC

[57] ABSTRACT

A method of processing recording media includes the steps of recording, on a second recording medium, image information recorded on a first recording medium; and effecting a parallel conveying operation for conveying the second recording medium on which the image information is recorded with divided portions of the second recording medium being arranged in a plural number of rows. The parallel conveying operation is effected in such a manner that the divided portions of the second recording medium are arranged such that a positional order of ends of the portions of the second recording medium which are disposed on an upstream side in a direction in which the second recording medium is conveyed coincides with an order of the image information being recorded on the first recording medium.

20 Claims, 10 Drawing Sheets

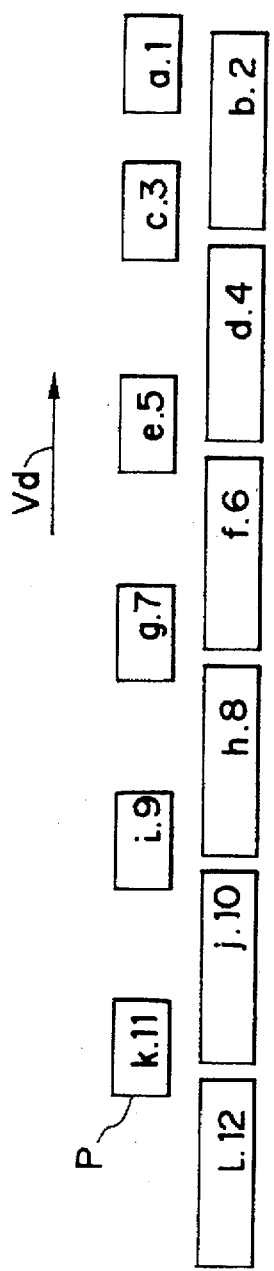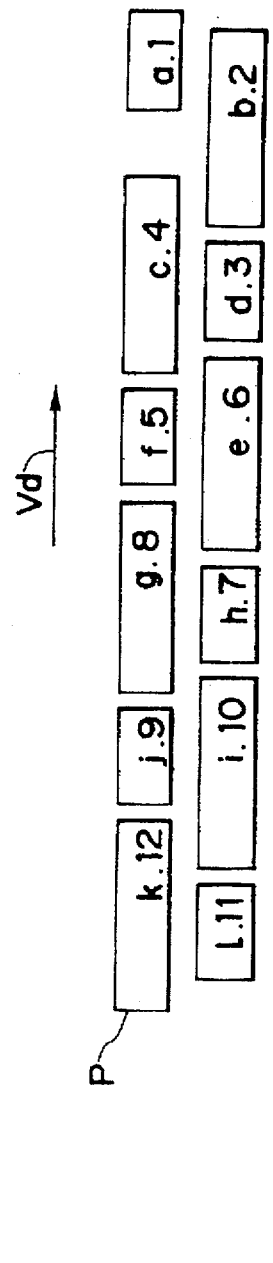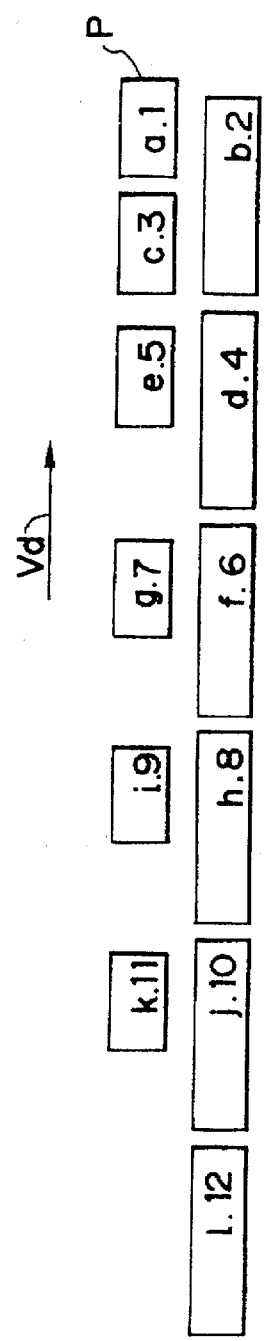
FIG. 6A
FIG. 6B
FIG. 11 PRIOR ART

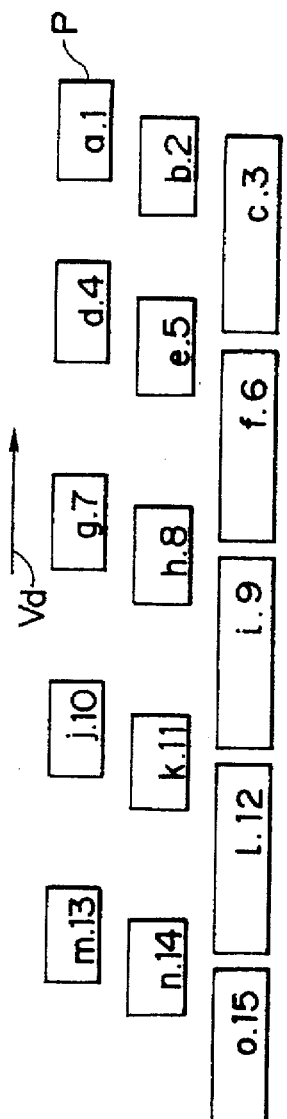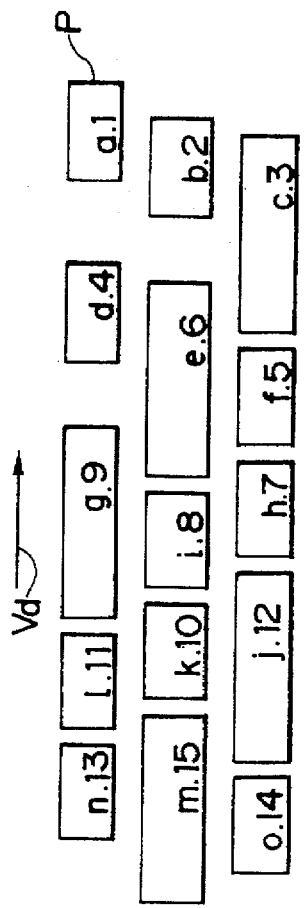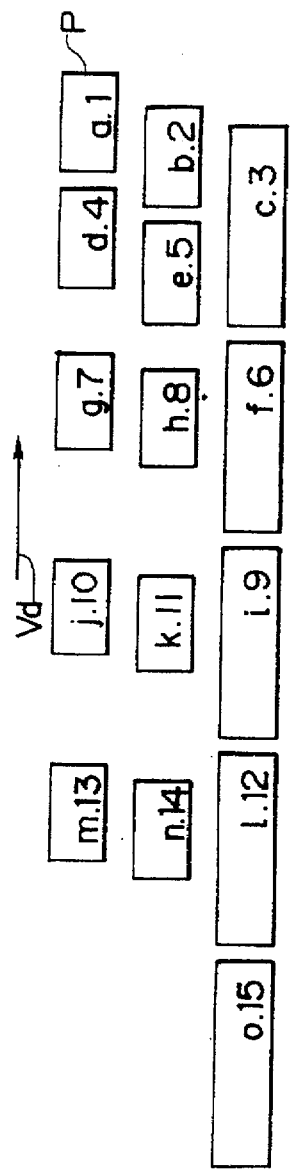

METHOD AND APPARATUS OF PROCESSING RECORDING MEDIA

BACKGROUND OF THE INVENTION

1. Field of the Invention

The present invention relates to a method and an apparatus of processing recording media, and particularly to a method and an apparatus of processing recording media when the recording media are conveyed and processed in a plural number of rows.

2. Description of the Related Art

There has been proposed a method in which a photosensitive material (for example, a photographic printing paper) on which images are printed is cut each image frame and the cut photosensitive materials are subjected to parallel development processing in a state of being distributed into the plural number of rows so as to improve processing ability (see Japanese Utility Model Publication No. 58-29464, Japanese Patent Application Laid-Open Nos. 4-106537 and 5-341398, and the like).

This method has an advantage in that the processing ability for a small-width photosensitive material is improved and a large-width photosensitive material can also be processed.

With this method, when the photosensitive material on which images are printed is subjected to development processing in a state of being distributed into two rows, respective pieces of the photosensitive material are alternately distributed in the order of image-printing thereon. When the photosensitive material is subjected to development processing in a state of being distributed into three rows, respective pieces of the photosensitive material are distributed sequentially from the side of an end row.

On the other hand, there has been recently proposed an apparatus for processing various photosensitive materials whose widths are the same and whose lengths are different in a mixed state.

However, when various photosensitive materials, of which lengths in a direction in which they are conveyed are different, are exposed in a state of being arranged in one row and are subjected to development processing in the above-described manner in a state of being distributed into the plural number of rows, the photosensitive material may be often discharged from a development processing section in the order different from that in which it is conveyed to the development processing section.

For example, as shown in FIGS. 11 and 12, in a case in which a short photosensitive material P and a long photosensitive material P are arranged in a mixed state, when these photosensitive materials are distributed in the above-described manner, the positions of respective trailing ends of the photosensitive materials (in a direction in which they are conveyed) to be conveyed in parallel are not arranged in the order of image-printing thereon (it should be noted that the figures described on the photographic printing papers P shown in these drawings indicate the order of frames and the alphabet indicate the order of image-printing).

As shown in FIG. 11, when an image on the fourth frame is first printed onto the long photosensitive material P, and subsequently, an image on the fifth frame is printed onto the short photosensitive material P, the trailing end of the long photosensitive material P is positioned further on a downstream side of the conveying direction than the trailing end of the short photosensitive material P (i.e., on a left side of the trailing end of the short one on the paper of FIG. 11). For this reason, although the long photosensitive material P (the image on the fourth frame) is previously printed, development processing of the short photosensitive material P (the image on the fifth frame) is completed earlier than the long photosensitive material P of the image on the fourth frame. As a result, there occurs a drawback in that the photosensitive materials cannot be accumulated in the order of image-printing (in the order of frames).

SUMMARY OF THE INVENTION

In view of the above-described circumstances, it is an object of the present invention to provide a method and an apparatus of processing recording media, in which the recording media can be accumulated in a predetermined order.

A first aspect of the present invention is a method of processing recording media, comprising the steps of: recording, on a second recording medium, image information recorded on a first recording medium; and effecting a parallel conveying operation for conveying the second recording medium on which the image information is recorded such that divided portions of the second recording medium are distributed into a plural number of rows, wherein the parallel conveying operation is effected with the divided portions of the second recording medium being arranged such that a positional order of ends of the portions of the second recording medium disposed on an upstream side in a direction in which the second recording medium is conveyed coincides with an order of the image information being recorded on the first recording medium.

A second aspect of tile present invention is a method of processing recording media, in the first aspect of the present invention, which comprises the steps of: reading the number of information, corresponding to a length of the second recording medium in a conveying direction thereof, which number is greater than or equal to the number of rows, prior to the parallel conveying operation; and comparing the read information of images corresponding to the length of the second recording medium in the conveying direction, and further comprises the step of determining an order in which the image information recorded on the first recording medium is recorded on the second recording medium and an order in which the divided portions of the second recording medium are distributed after the comparing step and prior to the parallel conveying operation, such that, in the parallel conveying operation, a positional order of ends of the portions of the second recording medium disposed on an upstream side in a direction in which the second recording medium is conveyed coincides with an order of the image information being recorded on the first recording medium and an interval between one portion of the second recording medium and precedingly-conveyed another portion thereof which is disposed in the same row as the one portion and at a conveying direction downstream side of the one portion becomes minimum.

A third aspect of the present invention is a method of processing recording media, in the first aspect of the present invention, which further comprising the steps of reading all of information about a length of each of the image information of the first recording medium recorded on the portions of the second recording medium in the conveying direction of the second recording medium prior to the parallel conveying operation, and determining an order in which the image information recorded on the first recording medium is recorded on the second recording medium and an order in which the divided portions of the second recording medium are distributed after the reading step and prior to the parallel conveying operation, such that, in the parallel conveying operation, a positional order of ends of the portions of the second recording medium which are disposed on an upstream side in the direction in which the second recording medium is conveyed coincides with an order of the image information being recorded on the first recording medium and such that an overall length, in the conveying direction, of the portions of the second recording medium on which the image information is recorded becomes minimum.

A fourth aspect of the present invention is a method of processing recording media, in the first aspect of the present invention, which further comprises the steps of: reading the number of information, corresponding to a length of the second recording medium in a conveying direction thereof, which number is greater than or equal to the number of rows, prior to the parallel conveying operation; comparing the read information of images corresponding to the length of the second recording medium in the conveying direction, and distributing the compared portions of the second recording medium such that the upstream end portions of the compared portions are arranged from the conveying direction downstream side to the conveying direction upstream side in the same order as the order in which the image information of the respective compared portions is recorded on the first recording medium, and such that the compared portions are disposed sequentially in an order in which the longest compared portion is positioned at the conveying direction upstream side of the preceding portion whose conveying direction trailing end portion is positioned the furthest downstream among the conveying direction trailing end portions of all of the preceding portions and the shortest compared portion is positioned at the conveying direction upstream side of the preceding portion whose conveying direction trailing end portion is positioned the furthest upstream among the conveying direction trailing end portions of all of the preceding portions.

A fifth aspect of the present invention is a method of processing recording media, in any of the first to fourth aspects of the present invention, which further comprises the steps of: accumulating and conveying the divided portions of the second recording medium after parallel conveying processing by a conveying-to-accumulating-section device for conveying the portions of the second recording medium in a direction perpendicular to the direction in which the portions of the second recording medium are conveyed in parallel after the parallel conveying operation, wherein, assuming that a speed at which the portions of the second recording medium are conveyed in parallel is given Vd, a conveying speed of the conveying-to-accumulating-section device is given VS, an interval between the portions of the second recording medium which are conveyed in a row on a downstream side in the conveying direction of the conveying-to-accumulating-section device and the portions thereof which are conveyed in a row on an upstream side in the conveying direction of the conveying-to-accumulating-section device is given t, and the minimum interval between an end of a preceding portion of the second recording medium which is disposed on an upstream side in a direction in which the portions of the second recording medium are conveyed in parallel and an end of a following portion of the second recording medium which is disposed on an upstream side in the direction of the portions of the second recording medium being conveyed in parallel is given S, the second recording medium is controlled such that the relation of $S > t(Vd/VS)$ is satisfied when the following portion of the second recording medium is distributed to the row on the downstream side in time conveying direction of the conveying-to-accumulating-section device and such that the relation of $S \geq 0$ is satisfied when the following portion of the second recording medium is distributed to the row on the upstream side in the conveying direction of the conveying-to-accumulating-section device.

A sixth aspect of the present invention is an apparatus of processing recording media, comprising: a recording device for recording image information of a first recording medium on a second recording medium; a conveying device for conveying the second recording medium on which image information is recorded; a distributing device for distributing divided portions of the second recording medium into a plural number of rows, the distributing device being provided further on an upstream side in a direction in which the second recording medium is conveyed than a position where the conveying device is disposed; and a control device for controlling at least one of the recording device and the distributing device such that, in a parallel conveying operation in which the divided portions of the second recording medium are conveyed in a state of being distributed into a plural number of rows, an order of ends of the portions of the second recording medium which are disposed on an upstream side in the conveying direction of the second recording medium coincides with an order of the image information being recorded on the first recording medium.

In accordance with the first aspect of the present invention, first, the image information recorded on the first recording medium is recorded on the second recording medium. The divided portions of the second recording medium on which the image information is recorded are distributed into a plural number of rows in a predetermined order and are conveyed in parallel. Here, the divided portions of the second recording medium are conveyed in parallel such that a positional order of ends of the divided portions which are disposed on an upstream side in a direction in which the second recording medium is conveyed coincides with an order of the image information being recorded on the first recording medium. For this reason, even if respective lengths of the divided portions of the second recording medium in the conveying direction thereof are different from each other, the divided portions of the second recording medium are conveyed in parallel in order of the image information being recorded on the first recording medium. Accordingly, when the divided portions of the second recording medium are accumulated after the parallel conveying operation, they can be accumulated in order of the image information being recorded on the first recording medium.

For example, in a case in which the first recording medium is a photographic negative film and the second recording medium is a photographic printing paper, an image on a first frame of the negative film is first printed onto a first photographic printing paper, an image on a second frame thereof is printed onto a second photographic printing paper, and images on subsequent frames are printed onto the corresponding photographic printing papers in numerical order of frames. The photographic printing papers on which images have been recorded are distributed into a plural number of rows in a predetermined order and are successively subjected to development processing, fixing processing, washing processing, drying processing, and the like. The positional order of ends (i.e., trailing ends) of the photographic printing papers disposed on an upstream side in the direction in which the photographic printing papers are conveyed coincides the numerical order of frames on the negative film. For this reason, even if the respective lengths of the photographic printing papers in the conveying direction thereof are different from each other, the photographic printing papers are subjected to the drying processing in numerical order of frames, so that the photographic printing papers which have been subjected to the drying processing can be accumulated in numerical order of frames.

In accordance with the second aspect of the present invention, first, the image information recorded on the first recording medium is recorded on the second recording medium. The divided portions of the second recording medium on which the image information is recorded are distributed into a plural number of rows in a predetermined order and are conveyed in parallel. Here, prior to the parallel conveying operation, the number of information, corresponding to a length of the second recording medium in a conveying direction thereof, which number is greater than or equal to the number of rows, is read in and compared. An order in which the image information recorded on the first recording medium is recorded on the second recording medium and an order in which the divided portions of the second recording medium are distributed are determined after the comparing step and prior to the parallel conveying operation, such that, in the parallel conveying operation, a positional order of ends (i.e., trailing ends) of the portions of the second recording medium disposed on an upstream side in a direction in which the second recording medium is conveyed coincides with an order of the image information being recorded on the first recording medium and an interval between one portion of the second recording medium and precedingly-conveyed another portion thereof which is arranged in the same row as the one portion and at a conveying direction downstream side of the one portion becomes minimum. As a result, the divided portions of the second recording medium are arranged such that a positional order of trailing ends of the divided portions coincides with the order of the image information being recorded on the first recording medium and are conveyed in parallel such that an interval between preceding and following portions of the second recording medium in the same row becomes minimum. Accordingly, even if the respective lengths of the divided portions of the second recording medium are different from each other, the divided portions of the second recording medium are conveyed in parallel in the order of the image information being recorded on the first recording medium and the overall length of the second recording medium in the conveying direction thereof is made shorter. In addition, the parallel conveying operation of the second recording medium can be effected in a short time. For this reason, when the divided portions of the second recording medium are accumulated after the parallel conveying operation, the divided portions can be accumulated in order of the image information being recorded on the first recording medium and further in a short time.

In accordance with tile third aspect of the present invention, the image information recorded on the first recording medium is recorded on the second recording medium. The divided portions of the second recording medium on which the image information is recorded are distributed into a plural number of rows in a predetermined order and are conveyed in parallel. Here, prior to the parallel conveying operation, all of information about a length of each of the image information of the first recording medium recorded on the portions of the second recording medium in the conveying direction of the second recording medium is read. An order in which the image information recorded on the first recording medium is recorded on the second recording medium and an order in which the divided portions of the second recording medium are distributed are determined after the reading step and prior to the parallel conveying operation, such that, in the parallel conveying operation, a positional order of ends (i.e., trailing ends) of the portions of the second recording medium which are disposed on an upstream side in the direction in which the second recording medium is conveyed coincides with an order of the image information being recorded on the first recording medium and such that an overall length, in the conveying direction, of the portions of the second recording medium on which the image information is recorded becomes minimum. As a result, the divided portions of the second recording medium are arranged such that a positional order of trailing ends thereof coincides with the order of the image information being recorded on the first recording medium and are conveyed in parallel such that the overall length of the second recording medium in the conveying direction becomes minimum. Accordingly, even if the respective lengths of the divided portions of the second recording medium are different from each other, the divided portions of the second recording medium are conveyed in parallel in the order of the image information being recorded on the first recording medium and the overall length of the second recording medium in the conveying direction thereof becomes shortest. For this reason, when the divided portions of the second recording medium are accumulated after the parallel conveying operation, the divided portions can be accumulated in order of the image information being recorded on the first recording medium and further in the shortest time.

In accordance with the fourth aspect of the present invention, the image information recorded on the first recording medium is recorded on the second recording medium. The divided portions of tile second recording medium on which the image information is recorded are distributed into a plural number of rows in a predetermined order and are conveyed in parallel. Here, prior to the parallel conveying operation, the number of information, corresponding to a length of the second recording medium in a conveying direction thereof, which number is greater than or equal to the number of rows, is read and compared. The compared portions of the second recording medium are distributed such that the upstream end portions of the compared portions are arranged from the conveying direction downstream side to the conveying direction upstream side in the same order as the order in which the image information of the respective compared portions is recorded on the first recording medium, and such that the compared portions are disposed sequentially in an order in which the longest compared portion is positioned at the conveying direction upstream side of the preceding portion whose conveying direction trailing end portion is positioned the furthest downstream among the conveying direction trailing end portions of all of the preceding portions and the shortest compared portion is positioned at the conveying direction upstream side of the preceding portion whose conveying direction trailing end portion is positioned the furthest upstream among the conveying direction trailing end portions of all of the preceding portions. Accordingly, the divided portions of the second recording medium are conveyed in parallel in the order of the image information being recorded on the first recording medium and the overall length of the second recording medium in the conveying direction thereof is made shorter. In addition, the parallel conveying operation of the second recording medium can be effected in a short time. For this reason, when the divided portions of the second recording medium are accumulated after the parallel conveying operation, they can be accumulated in order of the image information being recorded on the first recording medium and further in a short time.

In accordance with the fifth aspect of the present invention, the second recording medium which has been subjected to predetermined processing is discharged by the conveying device to the conveying-to-accumulating-section device, in which the divided portions of the second recording medium are conveyed in the direction perpendicular to the direction in which the divided portions are conveyed in parallel. In this case, the divided portions of the second recording medium are conveyed in parallel such that the relation of S>t(Vd/VS) (wherein, S is the minimum interval) is satisfied when the following portion of the second recording medium is distributed to the row on the downstream side in the conveying direction of the conveying-to-accumulating-section device and such that the relation of S≧0 is satisfied when the following portion of the second recording medium is distributed to the row on the upstream side in the conveying direction of the conveying-to-accumulating-section device. Accordingly, the conveying-to-accumulating-section device conveys the divided portions of the second recording medium in the order of the image information being recorded on the first recording medium and the divided portions of the second recording medium are accumulated on a downstream side in the conveying direction of the second recording medium in the order of the image information being recorded on the first recording medium.

In accordance with the sixth aspect of the present invention, first, the image information recorded on the first recording medium is recorded on the second recording medium by the recording device. The divided portions of the second recording medium on which the image information is recorded are distributed by the distributing device into a plural number of rows in a predetermined number and the distributed portions of the second recording medium are conveyed parallel in a plural number of rows by the conveying device. When the divided portions of the second recording medium are conveyed in parallel, the control device controls at least one of the recording device and the distributing device such that the positional order of the trailing ends of the divided portions of the second recording medium which are disposed on an upstream side in the conveying direction of the second recording medium coincides with the order of the image information being recorded on the first recording medium. For example, in a case in which the first recording medium is a photographic negative film and the second recording medium is a photographic printing paper, control of the recording device corresponds to controlling of an interval at which images are printed and exposed. Further, control of the distributing device corresponds to controlling of distribution time.

Thus, the parallel conveying operation of the second recording medium is effected such that the positional order of trailing ends of the divided portions of the second recording medium in the conveying direction thereof coincides with the order of the image information being recorded on the first recording medium. Accordingly, even if the respective lengths of the divided portions of the second recording medium in the conveying direction are different from each other, the divided portions of the second recording medium are conveyed in the order of the image information being recorded on the first recording medium. For this reason, when the divided portions of the second recording medium are accumulated after the parallel conveying operation, the divided portions can be accumulated in the order of the image information being recorded on the first recording medium.

BRIEF DESCRIPTION OF THE DRAWINGS

FIG. 6A shows an aspect of a conveying pattern when photographic printing papers are conveyed in two rows; and FIG. 6B shows another aspect of the conveying pattern when photographic printing papers are conveyed in two rows.

FIG. 9A shows an aspect of a conveying pattern in a case in which photographic printing papers are conveyed in three rows; and FIG. 9B shows another aspect of the pattern in the case in which photographic printing papers are conveyed in three rows.

FIG. 11 shows a conventional conveying pattern when the photographic printing papers are conveyed in two rows.

FIG. 12 shows a conventional conveying pattern when the photographic printing papers are conveyed in three rows.

DESCRIPTION OF THE PREFERRED EMBODIMENTS

Referring now to the attached drawings, a description will be hereinafter given of an embodiment of the present invention.

Figure 1:
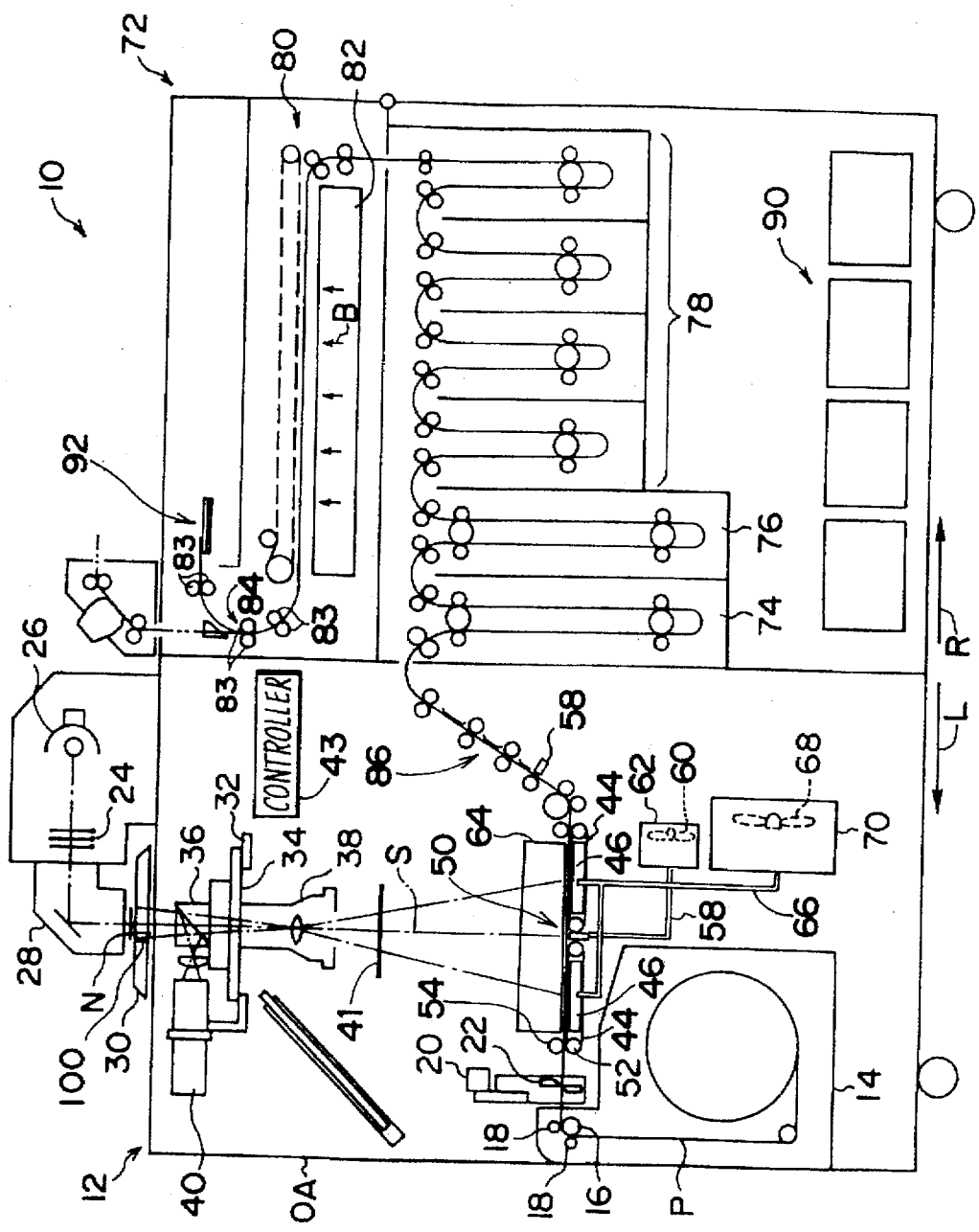
FIG. 1 is a side view showing an internal construction of a printer processor.

FIG. 1 shows a schematic construction of a printer processor 10 which is a photographic printer. A photographic printing section 12 which forms a printer section of the printer processor 10 is formed so as to be equipped with a paper magazine 14 in which a photographic printing paper P serving as a second recording medium is accommodated.

A drive roller 16 on which a proximal leading end of the photographic printing paper P is wound is rotatably supported by the paper magazine 14 at a left upper side thereof on the plane of FIG. 1. The drive roller 16 rotates by receiving driving force of an unillustrated motor within the photographic printing section 12. Further, a pair of nip rollers 18 are disposed at a position opposite to the drive roller 16 via the photographic printing paper P. For this reason, the photographic printing paper P are nipped between the drive roller 16 and the nip rollers 18 and is conveyed into the photographic printing section 12.

A cutter 22 having a pair of upper and lower edges which are moved by a motor 20 is disposed within the photographic printing section 12. The cutter 22 is adapted to cut the photographic printing paper P which has been conveyed from the paper magazine 14.

Figure 2:
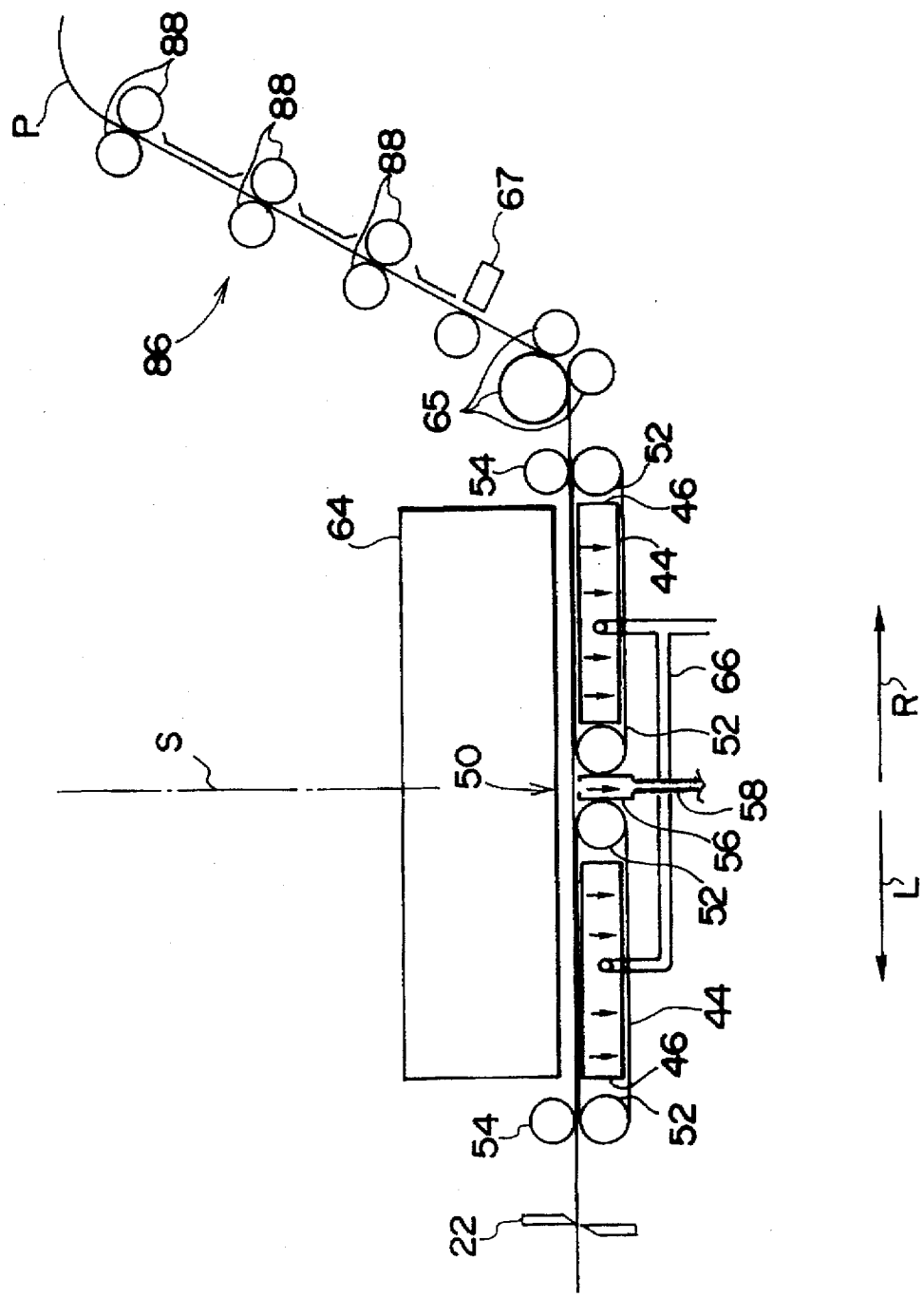
FIG. 2 is a side view of an exposure section and an accumulator.
Figure 3:
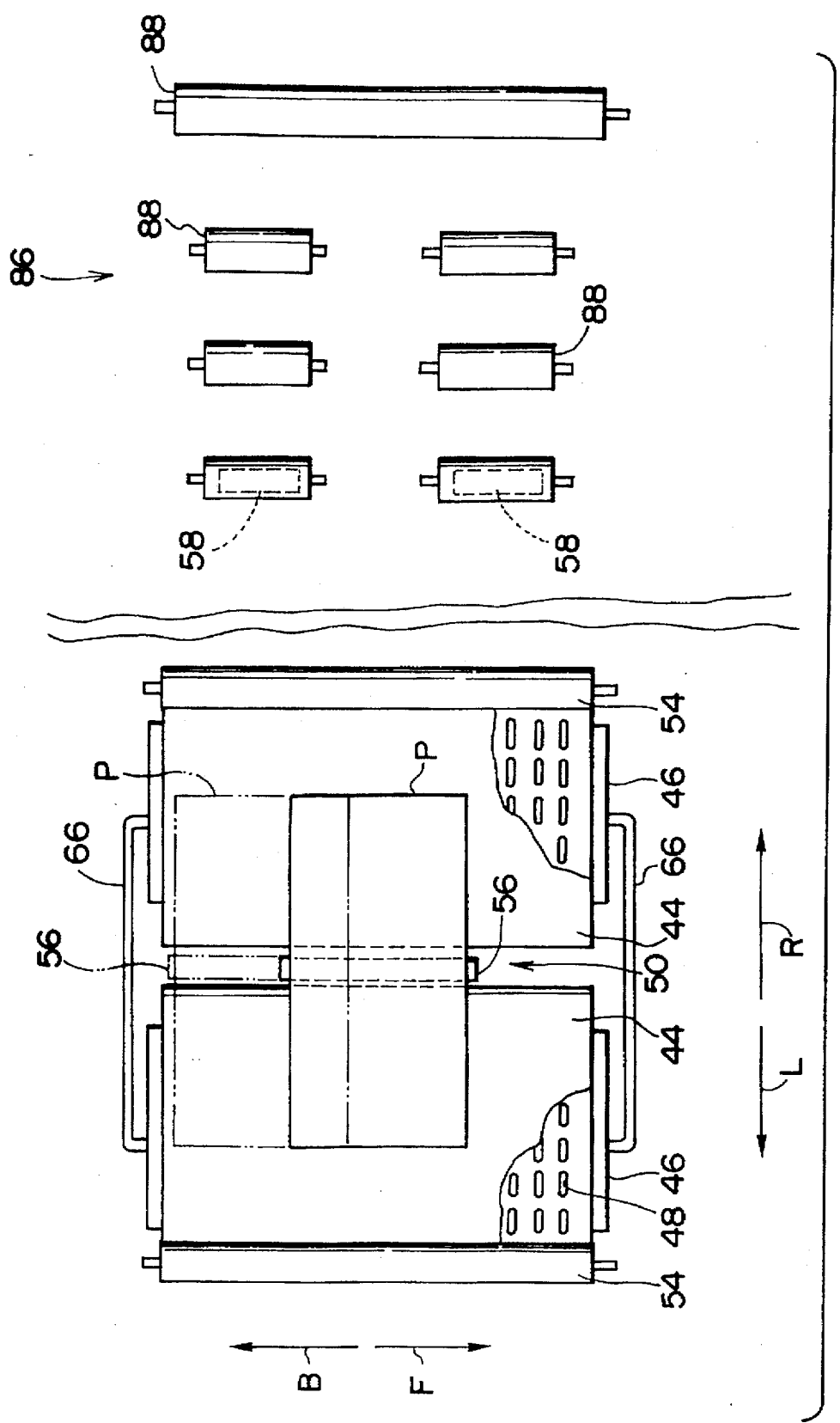
FIG. 3 is a development view of each principal portion of the exposure section and the accumulator.

As shown in FIGS. 2 and 3, two support stands 46 are disposed on a downstream side of the cutter 22 in a direction in which the photographic printing paper P is conveyed (i.e., on a right side of the cutter 22 on the paper of FIG. 2) and along the direction in which the photographic printing paper P is conveyed. Each of the support stands 46 is formed with an upper surface thereof disposed along a horizontal direction (i.e., a left-to-right direction in FIG. 2).

Training rollers 52 around which an endless belt 44 is trained are disposed in the horizontal direction at both ends of each of the support stands 46, i.e., at upstream-side and downstream-side ends thereof in the conveying direction of the photographic printing paper P. Nip rollers 54 are disposed at upper sides of the upstream-side and downstream-side training rollers 52 such that the endless belt 44 is nipped between the nip rollers 54 and the training rollers 52. The training rollers 52 are driven to rotate by driving force of an unillustrated motor to cause the endless belt 44 to rotate in a clockwise direction in FIG. 1.

As shown in FIG. 3, a large number of small holes 48 are formed over the whole area of the endless belt 44 and a large number of small holes (not shown) are formed on an upper surface of each of the support stands 46 on which a portion of the endless belt 44 is mounted, and are provided so as to correspond to the small holes of the endless belt 44.

An internal portion of each of the support stands 46 is formed into a cavity. A pair of communicating ducts 66 formed to correspond to respective both ends of the two endless belts 44 in the widthwise direction thereof are connected to the support stands 46. These communicating ducts 66 are connected to a fan box 70 in which a suction fan 68 shown in FIG. 1 is provided.

Provided between the support stands 46 is a distributing mechanism 50 which serves as a distributing device for moving the photographic printing paper P in a direction perpendicular to the direction in which the endless belt 44 is conveyed.

The distributing mechanism 50 includes a suction section 56 interposed between the support stands 46. The suction section 56 is formed into a box whose longitudinal direction is disposed along the axial direction of the training roller 52. A large number of small holes (not shown) are formed all over the upper surface of the suction section 56.

A duct 58 is connected to the suction section 56 and is, as shown in FIG. 1, connected to a fan box 62 having a suction fan 60.

The suction section 56 is adapted to be movable along the axial direction of the training roller 52 by an unillustrated motor mechanism.

It should be noted that the motor mechanism for moving the suction section 56, the suction fan 60 and the suction fan 68 are respectively controlled by a controller 43 which is provided within a casing 10A forming an external frame of the printer processor 10 to serve as a control device.

As shown in FIG. 1, an easel device 64 is provided above the endless belts 44 moving on the support stands 46. When an image having a peripheral edge line is printed and exposed onto the photographic printing paper P, an unillustrated movable piece provided within the easel device 64 is adapted to cover the periphery of the photographic printing paper P.

A diffusion chamber 28 for diffusing light is disposed above the casing 10A at a position above the easel device 64. A CC filter 24 is disposed near the diffusion chamber 28 on the right side thereof on the paper of FIG. 1. The CC filter 24 is formed from three filters C, M and Y which are movable so as to vary amounts by which these filters are inserted into an optical path. Accordingly, after light illuminated from a light source 26 positioned adjacent to the CC filter 24 has passed through the CC filter 24, the light is refracted while being diffused by the diffusion chamber 28 and is sent in a direction directly under the diffusion chamber 28. Thereafter, the light is transmitted through a negative film N serving as a first recording medium, which is placed on a negative carrier 30 mounted on an upper surface of the casing 10A.

Meanwhile, an ordinary negative film in 135 magazines is used for the negative film N of the present embodiment. This negative film is, as is well known, provided with frame numbers, bar codes corresponding to the frame numbers, and the like, on the side where perforations are formed for each image.

A support plate 34 is supported by a guide rail 32 provided within the photographic printing section 12 in such a manner as to be movable in the horizontal direction (i.e., the direction perpendicular to the plane of FIG. 1). A prism 36 and a zoom lens 38 are mounted on the support plate 34 so as to be disposed on an optical axis S of the above-described light.

Accordingly, the light which has been transmitted through the negative film N to form light for exposure is, after passing through the prism 36, further transmitted through the zoom lens 38 whose enlargement ratio can be varied and an image of the negative film N is thereby formed on the photographic printing paper P which is positioned below the easel device 64.

A density measurement device 40 for measuring density of the negative film N is disposed within the photographic printing section 12. The density measurement device 40 is formed by, for example, a color filter and an optical sensor such as a color filter. The light which has been refracted in the horizontal direction by the prism 36 is passed to the density measurement device 40. The density measurement device 40 is connected to a controller 43 serving as the control device, in which an exposure correction value when the negative film is printed and exposed is set on the basis of data measured by the density measurement device 40 and data inputted by a key operation of an operator.

Provided on the optical path between the zoom lens 38 and the easel device 64 is a black shutter 41 which is used when a printing/exposure operation is effected for a predetermined time by light whose color and intensity has been adjusted by the CC filter 24 and which has been transmitted through the negative film N.

As shown in FIG. 2, a roller group 65 is disposed on a downstream side of the support stands 46 in the conveying direction of the photographic printing paper P and a printing unit 67 for printing characters or the like on a back surface of the photographic printing paper P is provided on a downstream side of the roller group 65 in the conveying direction of the photographic printing paper P.

An accumulator 86 is disposed on a downstream side of the printing unit 67 in the conveying direction of the photographic printing paper P. The accumulator 86 includes a plurality of nip roller pairs 88 which are rotated by an unillustrated motor.

As shown in FIG. 1, a processor section 72 is provided on a downstream side of the accumulator 86 in the conveying direction of the photographic printing paper P.

A development tank 74 of the processor section 72 is filled with a developing solution. The photographic printing paper P is subjected to development processing in a state of being immersed in the developing solution. The photographic printing paper P which has been subjected to development processing is conveyed to a bleaching/fixing tank 76 disposed adjacent to the development tank 74. The bleaching/fixing tank 76 is filled with a bleaching/fixing solution. The photographic printing paper P is subjected to bleaching and fixing processing in a state of being immersed in the bleaching/fixing solution. The photographic printing paper P which has been subjected to bleaching/fixing processing is conveyed to a washing section 78 disposed adjacent to the bleaching/fixing tank 76 and having a plurality of washing tanks which are respectively filled with washing water. In the washing section 78, the photographic printing paper P is subjected to washing processing in a state of being immersed in washing water within the washing tanks. Meanwhile, development replenisher, bleaching/fixing replenisher, and washing replenishing water are respectively supplied with the development tank 74, bleaching/fixing tank 76 and washing tanks of the washing section 78 from a plurality of replenishing tanks 90 provided within the processor section 72, so as to replenish development solution, bleaching/fixing solution, and washing water to the respective processing tanks.

The photographic printing paper P which has been subjected to washing processing is conveyed to a drying section 80 disposed above the washing section 78. In the drying section 80, the photographic printing paper P is dried in such a manner as to be exposed to hot air blown from the side of a chamber 82, which is disposed below a transport path of the photographic printing paper P, along the direction indicated by arrow B in FIG. 1.

A transport path 84 formed by a plurality of roller pairs 83 is provided on a downstream side of the drying section 80 in the conveying direction of the photographic printing paper P. After the photographic printing paper P has been subjected to drying processing and discharged from the drying section 80, it is further discharged out of the printer processor 10 while being nipped by these roller pairs 83.

A sorter 92 is provided on the transport path 84 at a position where the photographic printing paper P is discharged.

Figure 4:
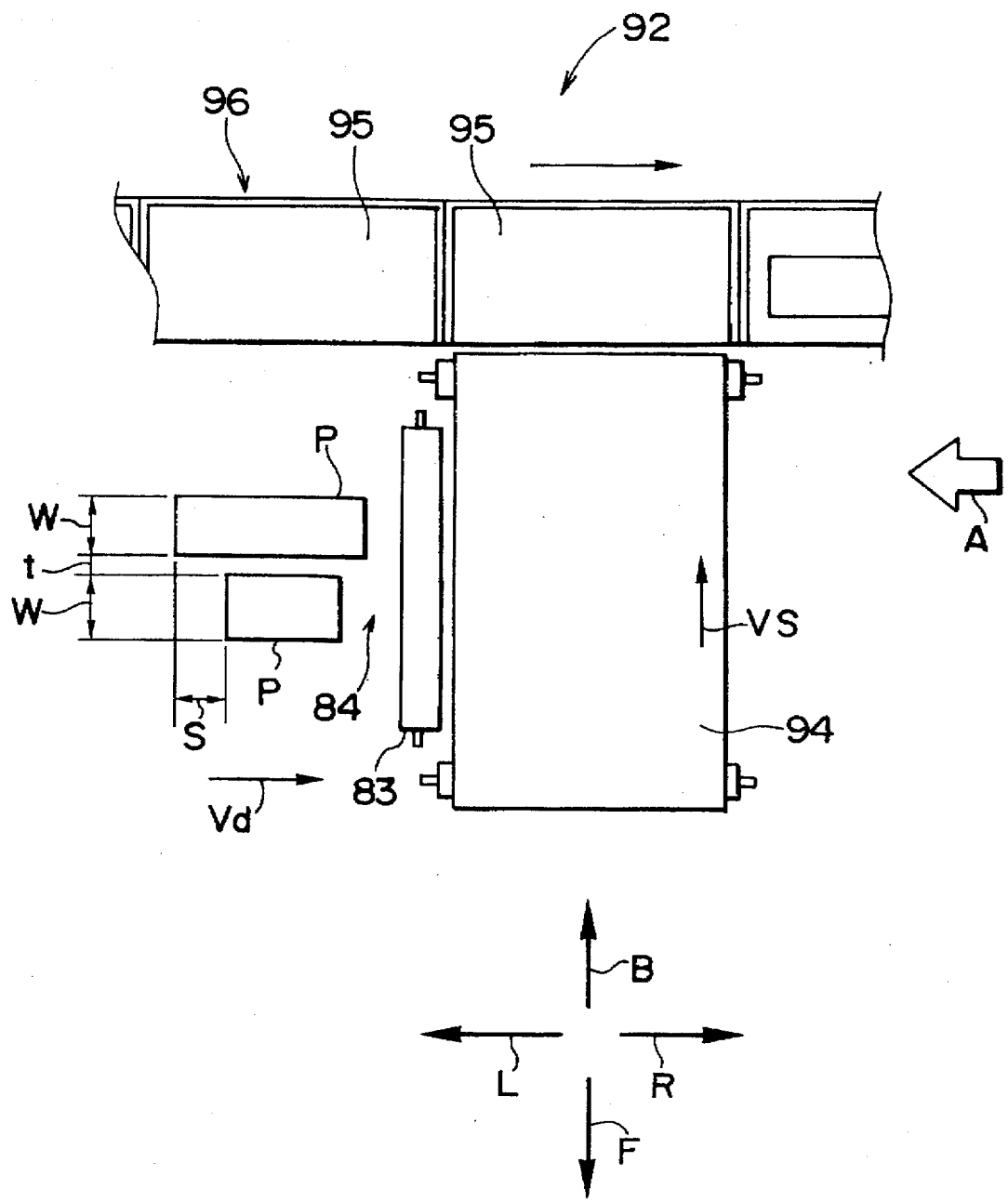
FIG. 4 is a plan view of a sorter section.
Figure 5:
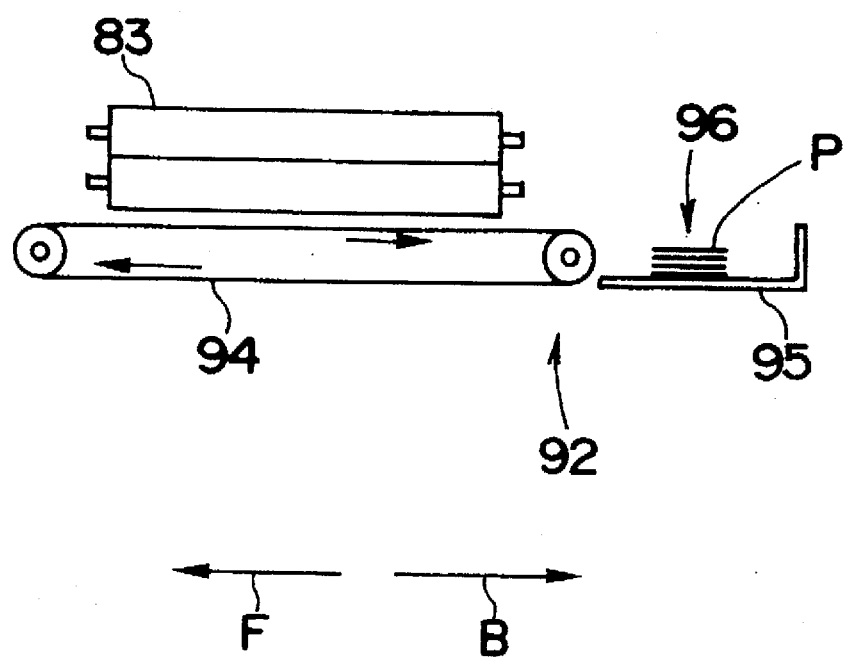
FIG. 5 is a view of the sorter section shown in FIG. 4 when seen from the direction indicated by arrow A.

As shown in FIGS. 4 and 5, the sorter 92 includes a belt conveyor 94 on a lower side of the transport path 84 in the position where the photographic printing paper P is discharged out. The belt conveyor 94 functions as a conveying-to-accumulating-section device for conveying the photographic printing paper P in a direction perpendicular to the conveying direction of the transport path 84. The sorter 92 also includes an accumulating section 96 which has a plurality of receiving trays 95 for accumulating the photographic printing papers P and which is provided below the downstream side of the belt conveyor 94 in the direction in which the photographic printing paper P is conveyed. It should be noted that the receiving trays 95 be movable by an unillustrated driving device in a direction perpendicular to the conveying direction of the belt conveyor 94.

Next, an operation of the present invention will be described.

A description will be given of, as an example, a case in which images recorded on one roll of negative film N are printed one to each frame.

An unexposed photographic printing paper P conveyed from the paper magazine 14 is, after having been cut by a cutter 22 to a desired length, conveyed to a position where an image is to be printed on the optical axis S of the light for exposure in a manner of being carried on the endless belt 44 (see FIG. 3).

When an operator effects a predetermined operation, the light for exposure from the side of the light source 26 is transmitted to the photographic printing paper P via the prism 36, zoom lens 38, and the like. When the black shutter 41 opens for a predetermined time, the image on the first frame which is recorded on the negative film N is printed and exposed onto the photographic printing paper P.

In this case, air within the support stands 46 is let out from a looped portion of the endless belt 44 to the widthwise-direction both ends thereof via the communicating ducts 66 and is further sucked by the suction fan 68 and blown out to an external side. As a result, each interior of the support stands 46 is brought into a negative-pressure state. The negative pressure is transmitted to the photographic printing paper P placed on the endless belt 44 via the small holes of the support stands 46 and the small holes of the endless belts 44 and the photographic printing paper P is attracted to the endless belts 44. For this reason, since the photographic printing paper P is not only carried by the endless belts 44, but also is attracted to the side of the endless belts 44, the photographic printing paper P is reliably conveyed by the endless belts 44 and is disposed horizontally at the position where an image is to be printed (i.e., the image-printing position).

After the image printing processing has been completed, the suction fan 68 stops and suction of the photographic printing paper P is temporarily canceled. After that, the suction fan 60 operates so that the suction section 56 attracts the photographic printing paper P. The suction section 56 in a state of attracting the photographic printing paper P moves by the motor mechanism in the direction indicated by arrow B in FIG. 3 to move the photographic printing paper P to the position indicated by the imaginary line in FIG. 3.

After the photographic printing paper P has moved in the direction of arrow B, the suction fan 60 stops so that the suction section 56 stops attracting the photographic printing paper P, and the suction fan 68 operates again. When the suction fan 68 operates, the photographic printing paper P is attracted to the endless belts 44 and is conveyed to the downstream side of the accumulator 86 and further to the side of the accumulator 86 while being nipped between the endless belts 44 and the nip rollers 54. When the photographic printing paper P is separated from the suction section 56, the suction section 56 returns to the image-printing position by the motor mechanism.

Meanwhile, characters or the like (for example, frame numbers) are printed on a back surface of the photographic printing paper P by the printing unit 67 during conveying of the photographic printing paper P from the image-printing position to the side of the accumulator 86. In order to effect subsequent exposure processing, the photographic printing paper P on which an image has been printed is promptly conveyed from the image-printing position to the accumulator 86.

When a trailing end of the photographic printing paper P in the conveying direction (i.e., an end of the photographic printing paper P disposed on an upstream side in the conveying direction) is separated from the endless belts 44 and the nip rollers 54, the nip roller pairs 88 convey the photographic printing paper P into the processor section 74 at a low speed in correspondence with a conveying speed of the processor section 74.

When the photographic printing paper P on which the image on the first frame has been printed is discharged into the accumulator 86, another unexposed photographic printing paper P cut to a predetermined length is conveyed to the image-printing position by the endless belts 44 and the image on the second frame is printed and exposed thereon.

The second photographic printing paper P is attracted to the suction section 56 after the image has been printed thereon, and is conveyed to the accumulator 86 after having been moved in a direction opposite to that in which the first printing paper P is moved (i.e., the direction indicated by arrow F in FIG. 3). Subsequent photographic printing papers P on which respective images have been printed are alternately distributed by the distributing mechanism 50 in the direction perpendicular to the conveying direction of the endless belts 44 in the same manner as described above.

The photographic printing paper P sent out of the accumulator 86 is conveyed to the processor section 72, in which the photographic printing paper P is sequentially subjected to development processing, bleaching and fixing processing, washing processing, and drying processing. Thereafter, when the photographic printing paper P is conveyed while being nipped by the roller pairs 83 on the transport path 84 and the trailing end thereof in the conveying direction is separated from the last roller pair 83, the photographic printing paper P drops on the belt conveyor 94 of the sorter 92 provided in an upper portion of the processor section 72.

Meanwhile, images having different aspect ratios may be mixedly recorded on the negative film N, and therefore, the photographic printing papers P may have different lengths in the direction in which they are conveyed. However, an image is printed onto a subsequent photographic printing paper after the preceding photographic printing paper P on which the image was printed has been discharged into the accumulator 86. For this reason, even if the photographic printing papers P have different lengths in the direction in which they are conveyed, respective trailing ends of the photographic printing papers P conveyed by the processor section 72 are arranged in order of images recorded on the negative film N as shown in FIG. 6A (it should be noted that numerals indicated on the photographic papers P shown in FIG. 6A designate the order of frames and alphabetical letters indicated thereon designate the order of images being printed).

Accordingly, even if the respective photographic printing papers P have different lengths in the direction in which they are conveyed, these photographic printing papers drop on the belt conveyor 94 in the order of images being recorded on the negative film N.

The photographic printing paper P which has dropped on the belt conveyor 94 is conveyed to the side of the accumulating section 96 and the photographic printing papers P dropping from an end of the belt conveyor 94 are respectively accumulated on the receiving trays 95 in the order of frames (namely, the photographic printing paper P on which the image on the first frame is printed is placed on the lowermost receiving tray 95).

Here, the photographic printing papers P falling on the belt conveyor 94 are adapted to fall in the order of frames on the negative film N. However, it is considered that, judging from an interval between adjacent photographic printing papers P in the direction perpendicular to the conveying direction drop timing of the photographic printing paper P dropping from the roller pairs 83 of the transport path 84, the conveying speed of the belt conveyor 94, and the like, a photographic printing paper P whose frame number is larger drops further on the downstream side of the belt conveyor 94 in the conveying direction than a photographic printing paper P whose frame number is smaller. As a result, the photographic printing paper P whose frame number is larger is placed below the photographic printing paper whose frame number is smaller and the photographic printing papers cannot be accumulated in numerical order of frames. For this reason, in the present embodiment, by considering the interval between adjacent photographic printing papers P, the drop timing of the photographic printing paper P dropping from the roller pairs 83 of the transport path 84, the conveying speed of the belt conveyor 94, and the like, a system is controlled such that the photographic printing papers P are accumulated in numerical order of frames on the negative film N so as to prevent occurrence of the above-described problem.

Assuming that, as a condition that the photographic printing papers P conveyed by the belt conveyor 94 are dropped in the accumulating section 96 reliably in order from the smallest frame number, for example, the conveying processing speed (parallel conveying speed) within the processor section 72 is given Vd, the conveying speed of the belt conveyor 94 is given Vs, the interval between the adjacent photographic printing papers P conveyed in parallel, in the direction perpendicular to the conveying direction of the photographic printing papers P is given t, and a minimum interval between the trailing end of a preceding photographic printing paper P and the trailing end of a following photographic printing paper P is given S, it suffices that S>t (Vd/Vs) be satisfied when the following photographic printing paper P is distributed to a row on a downstream side of the belt conveyor 94 in the conveying direction (i.e., to the side in the direction of arrow B), and it suffices that S≧0 be satisfied when the following printing paper P is distributed to a row on an upstream side of the belt conveyor 94 in the conveying direction (i.e., to the side in the direction indicated by arrow F). If S>t (Vd/Vs) will suffice when the following photographic printing paper P is distributed to the row on the downstream side of the belt conveyor 94 in the conveying direction (i.e., to the side in the direction of arrow B), the photographic printing papers P may partially overlap with each other on the belt conveyor 94. However, the photographic printing paper whose frame number is smaller can be placed on a lower side than the photographic printing paper whose frame number is larger. Thus, when the photographic printing papers are accumulated, the photographic printing paper whose frame number is smaller can be reliably disposed on the lower side of that whose frame number is larger.

Meanwhile, if the minimum interval S is determined between the trailing end of the preceding photographic printing paper P and the trailing end of the following photographic printing paper P such that S>(t+W)×(Vd/Vs) will suffice when the following photographic printing paper P is distributed to the row on the downstream side of the belt conveyor 94 in the conveying direction (i.e., to the side in the direction of arrow B), it is possible to prevent these photographic printing papers P from overlapping with each other on the belt conveyor 94 (wherein, W indicates the width of the photographic printing paper P in the direction perpendicular to the conveying direction of the processor section 72).

The minimum interval S between the trailing end of the preceding photographic printing paper P and the trailing end of the following photographic printing paper P can be varied by, for example, controlling an exposure interval, controlling the conveying speed of the endless belts 44, controlling the speed at which the photographic printing papers are distributed by the distributing mechanism 50, controlling the time when the photographic printing paper P is inserted from the accumulator 86 into the processor section 72 (i.e., causing the photographic printing paper P to wait in the accumulator 86 for a predetermined time), or the like. Further, it suffices that at least one of these controlling operations be effected, but a plurality of those may also be effected.

If only the aspect ratio of an image recorded on the negative film N is read by, for example, an image sensor 100 provided in the negative carrier 30, by the same number of frames as that of rows of the photographic printing papers conveyed in parallel, the respective lengths of the photographic printing papers P in the direction in which they are conveyed can be realized and an overall processing time for conveying the photographic printing papers can be shortened.

For example, in a case in which the photographic printing papers are conveyed in two rows, the photographic printing paper P of the first frame and the photographic printing paper P of the second frame are arranged in parallel, and a manner in which the following photographic printing papers P of the third and fourth frames are distributed after the preceding photographic printing papers P of the first and second frames is determined as follows.

Figure 7A:
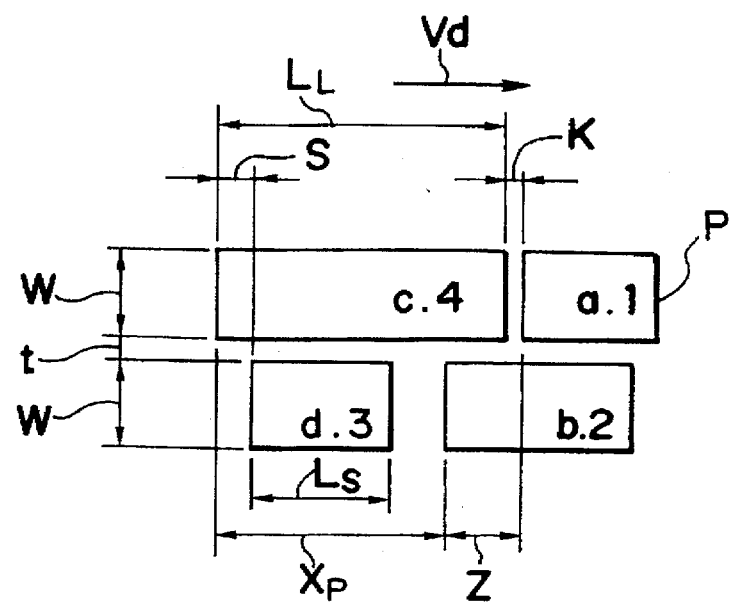
FIG. 7A shows an aspect of a pattern in a case in which two photographic printing papers whose dimensional difference is relatively large are distributed into two rows.
Figure 7B:
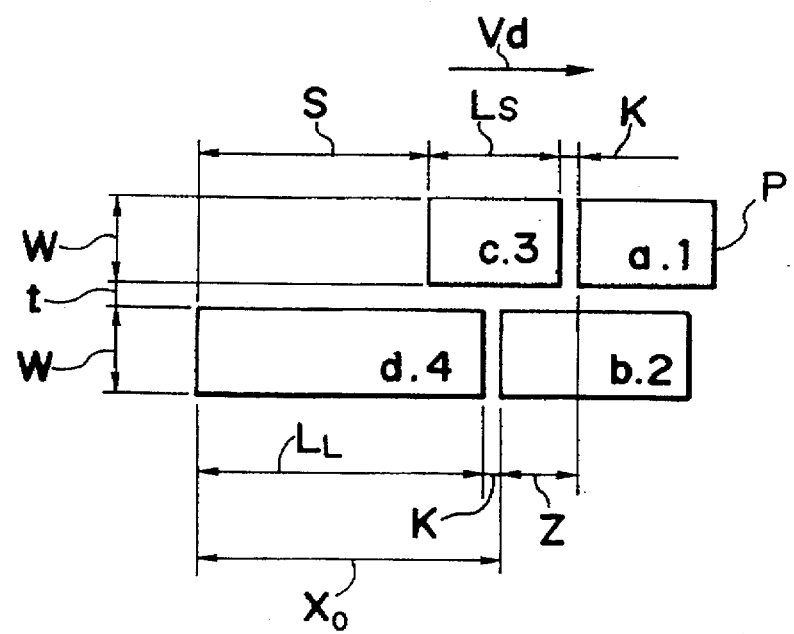
FIG. 7B shows another aspect of the pattern in the case in which two photographic printing papers whose dimensional difference is relatively large are distributed into two rows.

As shown in FIGS. 7 and 8, it is assumed that the length of the longest photographic printing paper P in the conveying direction is given $L_L$, the length of the shortest photographic printing paper P in the conveying direction is given $L_S$, the minimum interval between the photographic printing papers P arranged in the same row is given K, a distance between a trailing end of one of preceding two photographic printing papers P conveyed in parallel (i.e., a.1 and b.2 in FIG. 7A), which is disposed further at a rear side in the conveying direction than the other (i.e., disposed on the upstream side in the conveying direction), and a trailing end of one of following two photographic printing papers P conveyed in parallel (i.e., c.4 and d.3 in FIG. 7B), which is disposed further at a rear side in the conveying direction than the other, is given $X_P$, the pitch between respective training ends of the preceding adjacent image frames is given Z, and the distance between the trailing end of one of the preceding two photographic printing papers P conveyed in parallel (i.e., a.1 and b.2), which is disposed further at a rear side in the conveying direction than the other, and the trailing end of the longest photographic printing paper P (i.e., d.4), which is disposed subsequent to the preceding photographic printing paper (i.e., b.2) disposed further at the rear side than the other (see FIG. 7B) is given $X_O$.

For example, when the photographic printing papers are arranged continuously as shown in FIG. 7B, the overall length of the photographic printing papers in the conveying direction is made longer. As a result, the processing time becomes longer and processing efficiency deteriorates.

In order to convey the photographic papers P efficiently, the relationship between $K+L_L-Z$ and $K+L_S+S$ is first examined.

When $K+L_L-Z>K+L_S+S$, $X_P<X_O$ (i.e., the condition that the photographic printing papers P are conveyed more efficiently than the pattern shown in FIG. 7B) results in $K+L_L-Z<K+L_L$, and $K+L_L-Z>K+L_S+S$ is transformed into $L_L-L_S>K+S$ (wherein, $Z>0$).

Further, when $K+L_L-Z \leq K+L_S+S$, $X_P<X_O$ results in $K+L_S+S<K+L_L$ and is further transformed into $L_L-L_S>S$, and $K+L_L-Z \leq K+L_S+S$ results in $L_L-L_S \leq S+Z$. When $L_L-L_S \leq S+Z$ and $L_L-L_S>S$ is combined with each other to form $S+Z \geq L_L-L_S>S$.

Meanwhile, although it suffices that $S>0$, it is necessary that the value of S is somewhat large from the processing standpoint. However, when the value of S is excessively large, processing efficiency deteriorates.

As a result, the photographic printing papers can be efficiently conveyed in such a way that, when $L_L-L_S>S$ (when the difference between $L_L$ and $L_S$ is relatively large), the photographic printing paper P having length $L_L$ in the conveying direction is conveyed while being exposed and distributed in a state of preceding the photographic printing paper P having length $L_S$ in the conveying direction, and when $L_L-L_S \leq S$ (when the difference between $L_L$ and $L_S$ is relatively small), the photographic printing paper P having length $L_S$ in the conveying direction is conveyed while being exposed and distributed in a state of preceding the photographic printing paper P having length $L_L$ in the conveying direction.

When the difference between $L_L$ and $L_S$ is relatively large, for example, the parallel conveying patterns shown in FIGS. 7A and 7B are proposed. When the difference between $L_L$ and $L_S$ is relatively small, for example, the conveying patterns shown in FIGS. 8A, 8B and 8C are proposed.

Figure 8A:
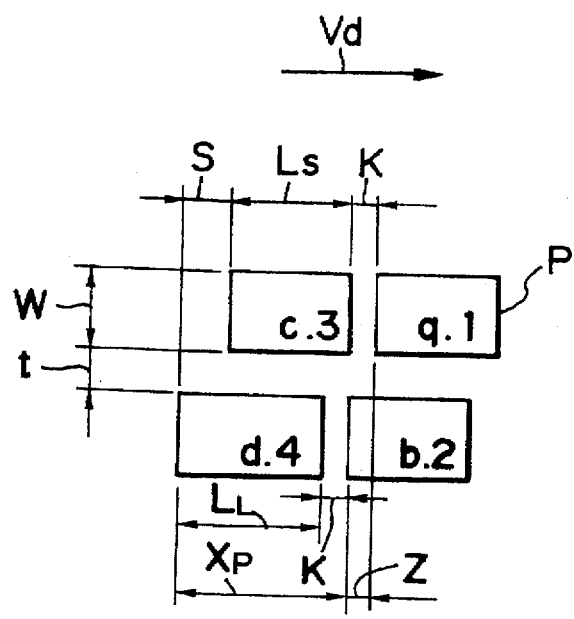
FIG. 8A shows an aspect of a pattern in a case in which two photographic printing papers whose dimensional difference is relatively small are distributed into two rows.
Figure 8B:
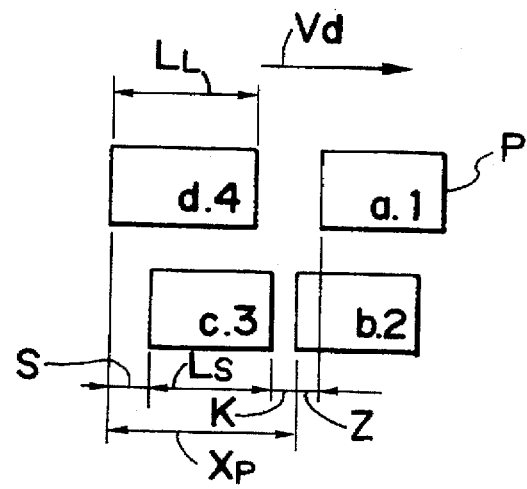
FIG. 8B shows another aspect of the pattern in the case in which two photographic printing papers whose dimensional difference is relatively small are distributed into two rows.
Figure 8C:
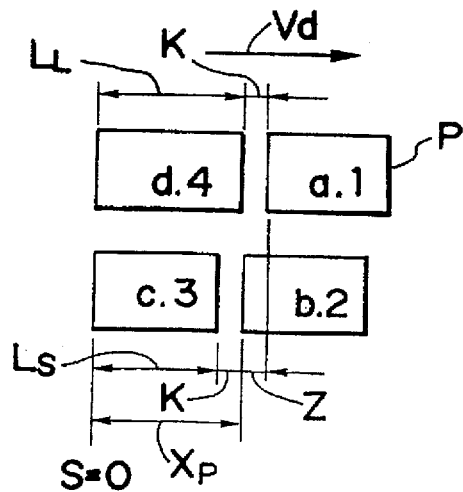
FIG. 8C shows still another aspect of the pattern in the case in which two photographic printing papers whose dimensional difference is relatively small are distributed into tow rows.

Namely, it can be understood that the photographic printing papers can be efficiently conveyed when, under the condition that $L_L-L_S>S$ (in the case in which the difference between $L_L$ and $L_S$ is relatively large), the photographic printing paper P having length $L_L$ in the conveying direction is conveyed while being exposed and distributed in a state of preceding the photographic printing paper P having length $L_S$ in the conveying direction as shown in FIG. 7A, and when, under the condition that $L_L-L_S \leq S$ (in the case in which the difference between $L_L$ and $L_S$ is relatively small), the photographic printing paper P having length $L_S$ in the conveying direction is conveyed while being exposed and distributed in a state of preceding the photographic printing paper P having length $L_L$ in the conveying direction as shown in FIG. 8A or 8B (it should be noted that, since FIG. 8C shows that the overall length of the photographic printing papers is made shorter, but that the trailing ends thereof are arranged uniformly, the pattern shown in FIG. 8C cannot be employed).

So long as the negative film N is scanned by the image sensor or the like all over the length thereof and respective aspect ratios of all of images are read by the image sensor 100 provided in the negative carrier 30, or the like, the length of the photographic printing paper P in the conveying direction can be realized. Accordingly, it becomes possible to convey the photographic printing papers P of one roll of the negative film N in the shortest time.

In the above-described embodiment, the case in which the images of the negative film N are printed onto the photographic printing papers was described. However, image information recorded on various recording media such as a floppy disk, a photo-magnetic disk, a CD-ROM, a photo-CD, an LSI memory, or the like may be printed onto the photographic printing paper by a laser beam or the like. These image information can also be sequentially processed and accumulated in order of images. Moreover, images may also be recorded (printed) on other recording media than the photographic printing paper P.

The images recorded on the negative film N can also be read by other equipment than the printer processor 10. In this case, after information representing each size of images (i.e., aspect ratio) has been communicated to the controller 43 of the printer processor 10 and has been temporarily recorded on an LSI memory or the like, the information recorded on the LSI memory may be read out and inputted to the controller 43.

When a magnetic recording layer is provided on the negative film N and information which indicates the size for printing of an image (i.e., the aspect ratio of the image) is recorded on the magnetic recording layer, the information can be read by an unillustrated sensor and the above-described controlling operation can be effected on the basis of the information.

Further, in the above-described embodiment, the case in which the parallel conveying operation is effected with the photographic printing papers P being distributed into two rows. However, the present invention is not limited to the same, and the parallel conveying operation can also be effected with the photographic printing papers P being distributed into two or more rows. Even when the photographic printing papers P are conveyed in parallel in a state of being arranged in two or more rows, they can naturally be conveyed and accumulated in order of images. For example, in a case in which the photographic printing papers P are conveyed in parallel in a state of being distributed into three rows, when they are distributed into three rows in the order of images being printed as shown in FIG. 12, the trailing ends of the photographic printing papers P are not arranged in numerical order of frames. For this reason, the photographic printing papers cannot be accumulated in numerical order of frames. However, when the photographic printing papers are distributed such that the respective trailing ends thereof are arranged in numerical order of frames as shown in FIG. 9A, these photographic printing papers can be accumulated in numerical order of frames. Further, by reading respective aspect ratios of all of the images prior to exposure processing, the photographic printing papers can be conveyed most efficiently as shown in FIG. 9B.

Figure 10:
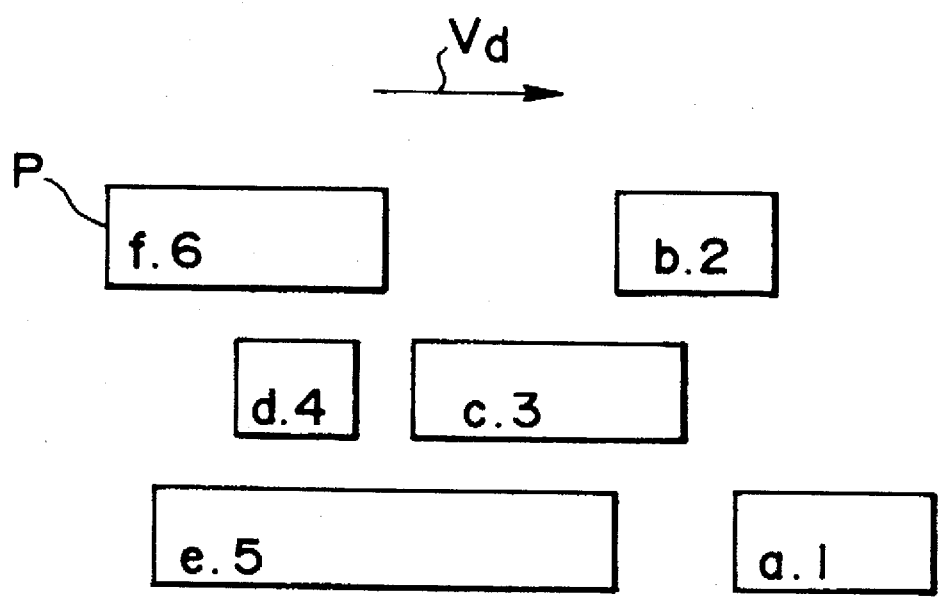
FIG. 10 shows a conveying pattern for shortening the overall length of the photographic printing papers in a direction in which they are conveyed when the photographic printing papers are conveyed in three rows.

Further, when an ordinary negative film in 135 magazines is used as the negative film N, LL–LS equals 31 to 127 mm. Further, it is necessary that the dimension S be 30 mm or thereabouts from the standpoint of processing. Accordingly, the conveying operation of the photographic printing papers can be effected relatively efficiently without making the above-described calculation of LL–LS and in such a way as described below. Namely, aspect ratios of images of the same number as that of rows at the least in correspondence with the length of prints are read by the image sensor 100 or the like prior to exposure processing; the longest photographic printing paper P (in FIG. 10, e.5) is arranged subsequent to the trailing end of one of n preceding photographic printing papers P (in FIG. 10, a.1, b.2, c.3), which is located first on a front side in the conveying direction, the long photographic printing papers P are sequentially arranged subsequent to the trailing ends of the preceding photographic printing papers P from the longest one, and the arranged photographic printing papers P are distributed such that respective trailing ends thereof are arranged in numerical order of frames (in order of image information) being recorded on the negative film N. This method makes it possible to simplify the control algorithm, to provide the apparatus at a low cost, and to improve reliability, and the like. Moreover, in most cases, this method becomes useful for processing efficiency.

In addition, when the photographic printing papers are conveyed in parallel in a state of being arranged in three or more rows, it suffices that the number of images to be read in advance so as to realize the length of prints (i.e., the length of the photographic printing paper in the conveying direction) be plural, not a number of rows. Even in this case, it is possible to, although insufficient, obtain a certain degree of effects.

Further, the length of the photographic printing paper P in the conveying direction or the aspect ratio of the image may also be inputted from an unillustrated keyboard or the like by an operator.

What is claimed is:

1. A method of processing recording media, comprising the steps of:

recording, on a second recording medium, image information recorded on a first recording medium; and effecting a parallel conveying operation for conveying the second recording medium on which the image information is recorded such that divided portions of the second recording medium are distributed into a plural number of rows, wherein said parallel conveying operation is effected with the divided portions of the second recording medium being arranged such that a positional order of ends of the portions of the second recording medium disposed on an upstream side in a direction in which the second recording medium is conveyed coincides with an order of the image information recorded on the first recording medium;

and wherein, for each of the divided portions of the second recording medium, a length of the divided portion in the conveying direction is used a criteria for determining in which of said plural number of rows the divided portion is placed and for determining an interval between the divided portion and a precedingly-conveyed portion of the second recording medium which is disposed in the same row.

2. A method of processing recording media according to claim 1, further comprising the steps of:

reading the number of information, corresponding to a length of the second recording medium in a conveying direction thereof, which number is greater than or equal to the number of rows, prior to said parallel conveying operation; and comparing the read information of images corresponding to the length of the second recording medium in the conveying direction.

3. A method of processing recording media according to claim 2, further comprising the steps of:

determining an order in which the image information recorded on the first recording medium is recorded on the second recording medium and an order in which the divided portions of the second recording medium are distributed after said comparing step and prior to said parallel conveying operation, such that, in said parallel conveying operation, a positional order of ends of the portions of the second recording medium disposed on an upstream side in a direction in which the second recording medium is conveyed coincides with an order of the image information being recorded on the first recording medium and an interval between one portion of the second recording medium and precedingly-conveyed another portion thereof which is disposed in the same row as the one portion and at a conveying direction downstream side of the one portion becomes minimum.

4. A method of processing recording media according to claim 3, further comprising the steps of:

accumulating and conveying the divided portions of the second recording medium after parallel conveying processing by a conveying-to-accumulating-section device for conveying the portions of the second recording medium in a direction perpendicular to the direction in which the portions of the second recording medium are conveyed in parallel after said parallel conveying operation, wherein, assuming that a speed at which the portions of the second recording medium are conveyed in parallel is given Vd, a conveying speed of the conveying-to-accumulating-section device is given VS, an interval between the portions of the second recording medium which are conveyed in a row on a downstream side in the conveying direction of the conveying-to-accumulating-section device and the portions thereof which are conveyed in a row on an upstream side in the conveying direction of the conveying-to-accumulating-section device is given t, and the minimum interval between an end of a preceding portion of the second recording medium which is disposed on an upstream side in a direction in which the portions of the second recording medium are conveyed in parallel and an end of a following portion of the second recording medium which is disposed on an upstream side in the direction of the portions of the second recording medium being conveyed in parallel is given S, the second recording medium is controlled such that the relation of $S > t(Vd/VS)$ is satisfied when the following portion of the second recording medium is distributed to the row on the downstream side in the conveying direction of the conveying-to-accumulating-section device and such that the relation of $S \geq 0$ is satisfied when the following portion of the second recording medium is distributed to the row on the upstream side in the conveying direction of the conveying-to-accumulating-section device.

5. A method of processing recording media according to claim 3, wherein distribution of the divided portions of the second recording medium in said parallel conveying operation is effected with the second recording medium after recording of the image information being moved in a direction substantially perpendicular to the conveying direction of the second recording medium.

6. A method of processing recording media according to claim 1, further comprising the steps of:

reading all of information about a length of each of the image information of the first recording medium recorded on the portions of the second recording medium in the conveying direction of the second recording medium prior to said parallel conveying operation.

7. A method of processing recording media according to claim 6, further comprising the steps of:

determining an order in which the image information recorded on the first recording medium is recorded on the second recording medium and an order in which the divided portions of the second recording medium are distributed after said reading step and prior to said parallel conveying operation, such that, in said parallel conveying operation, a positional order of ends of the portions of the second recording medium which are disposed on an upstream side in the direction in which the second recording medium is conveyed coincides with all order of the image information being recorded on the first recording medium and such that an overall length, in the conveying direction, of the portions of the second recording medium on which the image information is recorded becomes minimum.

8. A method of processing recording media according to claim 7, further comprising the steps of:

accumulating and conveying the divided portions of the second recording medium after parallel conveying processing by a conveying-to-accumulating-section device for conveying the portions of the second recording medium in a direction perpendicular to the direction in which the portions of the second recording medium are conveyed in parallel after said parallel conveying operation, wherein, assuming that a speed at which the portions of the second recording medium are conveyed in parallel is given Vd, a conveying speed of the conveying-to-accumulating-section device is given VS, an interval between the portions of the second recording medium which are conveyed in a row on a downstream side in the conveying direction of the conveying-to-accumulating-section device and the portions thereof which are conveyed in a row on an upstream side in the conveying direction of the conveying-to-accumulating-section device is given t, and the minimum interval between an end of a preceding portion of the second recording medium which is disposed on an upstream side in a direction in which the portions of the second recording medium are conveyed in parallel and an end of a following portion of the second recording medium which is disposed on an upstream side in the direction of the portions of the second recording medium being conveyed in parallel is given S, the second recording medium is controlled such that the relation of $S > t(Vd/VS)$ is satisfied when the following portion of the second recording medium is distributed to the row on the downstream side in the conveying direction of the conveying-to-accumulating-section device and such that the relation of $S \geq 0$ is satisfied when the following portion of the second recording medium is distributed to the row on the upstream side in the conveying direction of the conveying-to-accumulating-section device.

9. A method of processing recording media according to claim 7, wherein distribution of the divided portions of the second recording medium in said parallel conveying operation is effected with the second recording medium after recording of the image information being moved in a direction substantially perpendicular to the conveying direction of the second recording medium.

10. A method of processing recording media according to claim 1, further comprising the steps of:

accumulating and conveying the divided portions of the second recording medium after parallel conveying processing by a conveying-to-accumulating-section device for conveying the portions of the second recording medium in a direction perpendicular to the direction in which the portions of the second recording medium are conveyed in parallel after said parallel conveying operation, wherein, assuming that a speed at which the portions of the second recording medium are conveyed in parallel is given Vd, a conveying speed of the conveying-to-accumulating-section device is given VS, an interval between the portions of the second recording medium which are conveyed in a row on a downstream side in the conveying direction of the conveying-to-accumulating-section device and the portions thereof which are conveyed in a row on an upstream side in the conveying direction of the conveying-to-accumulating-section device is given t, and the minimum interval between an end of a preceding portion of the second recording medium which is disposed on an upstream side in a direction in which the portions of the second recording medium are conveyed in parallel and an end of a following portion of the second recording medium which is disposed on an upstream side in the direction of the portions of the second recording medium being conveyed in parallel is given S, the second recording medium is controlled such that the relation of $S>t(Vd/VS)$ is satisfied when the following portion of the second recording medium is distributed to the row on the downstream side in the conveying direction of the conveying-to-accumulating-section device and such that the relation of $S \geq 0$ is satisfied when the following portion of the second recording medium is distributed to the row on the upstream side in the conveying direction of the conveying-to-accumulating-section device.

11. A method of processing recording media according to claim 1, further comprising the steps of:

reading the number of information, corresponding to a length of the second recording medium in a conveying direction thereof, which number is greater than or equal to the number of rows, prior to said parallel conveying operation; and comparing the read information of images corresponding to the length of the second recording medium in the conveying direction.

12. A method of processing recording media according to claim 11, further comprising the steps of:

distributing the compared portions of the second recording medium such that the upstream end portions of the compared portions are arranged from the conveying direction downstream side to the conveying direction upstream side in the same order as the order in which the image information of the respective compared portions is recorded on the first recording medium, and such that the compared portions are disposed sequentially in an order in which the longest compared portion is positioned at the conveying direction upstream side of the preceding portion whose conveying direction trailing end portion is positioned the furthest downstream among the conveying direction trailing end portions of all of the preceding portions and the shortest compared portion is positioned at the conveying direction upstream side of the preceding portion whose conveying direction trailing end portion is positioned the furthest upstream among the conveying direction trailing end portions of all of the preceding portions.

13. A method of processing recording media according to claim 12, further comprising the steps of:

accumulating and conveying the divided portions of the second recording medium after parallel conveying processing by a conveying-to-accumulating-section device for conveying the portions of the second recording medium in a direction perpendicular to the direction in which the portions of the second recording medium are conveyed in parallel after said parallel conveying operation, wherein, assuming that a speed at which the portions of the second recording medium are conveyed in parallel is given Vd, a conveying speed of the conveying-to-accumulating-section device is given VS, an interval between the portions of the second recording medium which are conveyed in a row on a downstream side in the conveying direction of the conveying-to-accumulating-section device and the portions thereof which are conveyed in a row on an upstream side in the conveying direction of the conveying-to-accumulating-section device is given t, and the minimum interval between an end of a preceding portion of the second recording medium which is disposed on an upstream side in a direction in which the portions of the second recording medium are conveyed in parallel and an end of a following portion of the second recording medium which is disposed on an upstream side in the direction of the portions of the second recording medium being conveyed in parallel is given S, the second recording medium is controlled such that the relation of $S>t(Vd/VS)$ is satisfied when the following portion of the second recording medium is distributed to the row on the downstream side in the conveying direction of the conveying-to-accumulating-section device and such that the relation of $S \geq 0$ is satisfied when the following portion of the second recording medium is distributed to the row on the upstream side in the conveying direction of the conveying-to-accumulating-section device.

14. A method of processing recording media according to claim 12, wherein distribution of the divided portions of the second recording medium in said parallel conveying operation is effected with the second recording medium after recording of the image information being moved in a direction substantially perpendicular to the conveying direction of the second recording medium.

15. A method of processing recording media according to claim 1, wherein distribution of the divided portions of the second recording medium in said parallel conveying operation is effected with the second recording medium after recording of the image information being moved in a direction substantially perpendicular to the conveying direction of the second recording medium.

16. An apparatus of processing recording media, comprising:

a recording device for recording image information of a first recording medium on a second recording medium;

a conveying device for conveying the second recording medium on which image information is recorded;

a distributing device for distributing divided portions of the second recording medium into a plural number of rows, said distributing device being provided further on an upstream side in a direction in which the second recording medium is conveyed than a position where said conveying device is disposed;

and a control device for controlling at least one of said recording device and said distributing device such that, in a parallel conveying operation in which the divided portions of the second recording medium are conveyed in a state of being distributed into a plural number of rows, an order of ends of the portions of the second recording medium which are disposed on an upstream side in the conveying direction of the second recording medium coincides with an order of the image information recorded on the first recording medium, said control device using a length in the conveying direction of each divided portion of the second recording medium as a criteria for determining in which of said plural number of rows the divided portion is placed and for determining an interval between the divided portion and a precedingly-conveyed portion of the second recording medium which is disposed in the same row.

17. An apparatus of processing recording media according to claim 16, wherein said distributing device distributes the divided portions of the second recording medium after recording of the image information by said recording device by moving the portions of the second recording medium in a direction substantially perpendicular to a conveying direction of said conveying device.

18. An apparatus of processing recording media according to claim 17, wherein said distributing device comprises a suction section and sucks to move the second recording medium.

19. An apparatus of processing recording media according to claim 16, wherein said control device effects control processing by reading information of images of at least the same number of that of rows corresponding to a length of the second recording medium in the conveying direction of said conveying device.

20. An apparatus of processing recording media according to claim 16, further comprising:

a conveying-to-accumulating-section device which, after the parallel conveying operation of the divided portions of the second recording medium, conveys the portions of the second recording medium in a direction substantially perpendicular to a direction in which the portions are conveyed in parallel, so as to accumulate the portions of the second recording medium in an accumulating section.

* * * * *